United States Patent [19]

Younkin et al.

[11] Patent Number: 5,412,645
[45] Date of Patent: May 2, 1995

[54] DISTRIBUTED PROCESSING TELECOMMUNICATION SWITCH WITH STANDARDIZED SWITCH UNITS

[75] Inventors: Chester R. Younkin, Ellicott City; Stephen R. Wigler, Columbia, both of Md.

[73] Assignee: Westinghouse Electric Corporation, Pittsburgh, Pa.

[21] Appl. No.: 743,476

[22] Filed: Aug. 9, 1991

[51] Int. Cl.[6] .................................. H04Q 11/04
[52] U.S. Cl. ......................... 370/58.3; 370/67; 370/110.1; 370/58.1
[58] Field of Search .............. 370/58.1, 58.2, 58.3, 370/94.1, 60, 110.1, 79, 77, 67, 85.1, 85.3, 95.3, 95.1, 85.9, 16, 16.1; 379/93, 94, 95, 96; 395/800, 725; 371/29.1, 29.5, 8.1, 11.1; 340/827; 455/37.1, 101

[56] References Cited

U.S. PATENT DOCUMENTS

| | | | |
|---|---|---|---|
| 4,710,916 | 12/1987 | Amstutz et al. | 370/58.1 |
| 4,763,317 | 8/1988 | Lehman et al. | 370/58.1 |
| 4,796,022 | 1/1989 | Schenkel et al. | 370/85.8 |
| 4,979,164 | 12/1990 | Ardon | 370/58.1 |
| 5,008,879 | 4/1991 | Fischer et al. | 370/84 |
| 5,034,948 | 7/1991 | Mizutani et al. | 370/110.1 |
| 5,043,983 | 8/1991 | Dorst et al. | 370/110.1 |
| 5,067,125 | 11/1991 | Tsuchida | 370/110.1 |
| 5,072,442 | 12/1991 | Todd | 370/84 |
| 5,077,734 | 12/1991 | Ohtsuka | 370/110.1 |
| 5,136,585 | 8/1992 | Nizamuddin et al. | 370/110.1 |
| 5,167,019 | 11/1992 | Fava et al. | 370/85.1 |
| 5,204,857 | 4/1993 | Obara | 370/79 |
| 5,229,994 | 7/1993 | Balzano et al. | 370/79 |
| 5,241,539 | 8/1993 | Obermeier | 370/79 |

*Primary Examiner*—Douglas W. Olms
*Assistant Examiner*—Dang Ton

[57] ABSTRACT

A telecommunication switching system uses identically constructed and programmed switch units in a distributed processing system. The switch units include both analog and ISDN interfaces so that each supports connections to any type of equipment supported by the system. The switch units are connected by a circulating bus carrying both message and voice data.

6 Claims, 3 Drawing Sheets

DISTRIBUTED PROCESSING TELECOMMUNICATION SWITCH WITH STANDARDIZED SWITCH UNITS

BACKGROUND OF THE INVENTION

1. Field of the Invention

The present invention is directed to a telecommunication switching system for interconnecting different types of telecommunication terminal equipment and, more particularly, to a telecommunication switching system having processing distributed in switch units connected by a bus.

2. Description of the Related Art

Known telecommunication switching systems for locally connected terminal equipment which are commonly used in applications, such as private branch exchanges, are typically one of two types. The first type uses a centralized processing system which may have one or more processors, particularly for redundancy. This centralized processing system performs all switching operations for the entire system and thus must have sufficient capacity to handle a maximum amount of terminal equipment, i.e., telephones, facsimile machines, etc. When used at maximum capacity, the first type of system can be very efficient. However, the ability to expand the system or to use the same type of system at many installations having varying amounts of terminal equipment is often desired. The first type of switching system with its centralized processing system will not be run at maximum efficiency at most installations.

The second type of conventional switching system is designed to provide greater flexibility. Processing is distributed in modules of the terminal equipment. Each module usually uses a processor to control switching and the modules are connected, so that data and voice samples can be interchanged. This design enables the second type of switching system to provide higher efficiency in a larger number of applications than the first type of system, by adding or removing modules. As long as the terminal equipment connected to the switching system is reasonably homogenous, e.g., all telephones of the same type, the second type of system has a relatively simple construction with the same interfaces connected to and operations performed by all of the processors. However, in other environments where there is a mixture of integrated systems digital network (ISDN) terminal equipment and analog terminal equipment, such as analog telephones and radios, different nodes are provided for different types of terminal equipment. The processors have to be programmed differently, despite providing many similar functions, thus increasing the programming effort to create and maintain the switching system, when additional functions are added. For example, if the ISDN terminal equipment which can be connected to the switching system is upgraded or additional types of equipment are added requiring changes to the program in the processors controlling the nodes for ISDN equipment, these changes may require changes to the programs in the processors in the nodes for analog terminal equipment. Systems of the second type often have more than one type of ISDN interface or more than one type of analog interface, each designed to support a specific type of telecommunication terminal equipment. As a result, a new interface board has to be added every time a different type of equipment is connected to the system and maintenance of the software becomes increasingly complicated.

SUMMARY OF THE INVENTION

An object of the present invention is to provide a telecommunication switching system which is flexible and provides for ease of connection and maintenance.

Another object of the present invention is to provide a telecommunication switching system using distributed processing in which all processors execute the same program and support all types of terminal equipment.

The above objects are attained by providing a system for interconnecting different types of telecommunication terminal equipment, comprising: switch units, each including at least one interface for each type of telecommunication terminal equipment supported by the system and a processor to control access to the system by the telecommunication terminal equipment connected thereto and a bus connecting the switch units. Preferably, the bus is a unidirectional circulating time division multiplex bus and each interface in each switch unit has a time slot for transmitting telecommunication data and control signals via the bus to all of the interfaces in all of the switch units. The switch units each include an analog interface for connecting to all types of analog devices and an ISDN interface for connecting to all types of ISDN equipment. Digital/analog and analog/digital conversion is provided for the analog interfaces.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
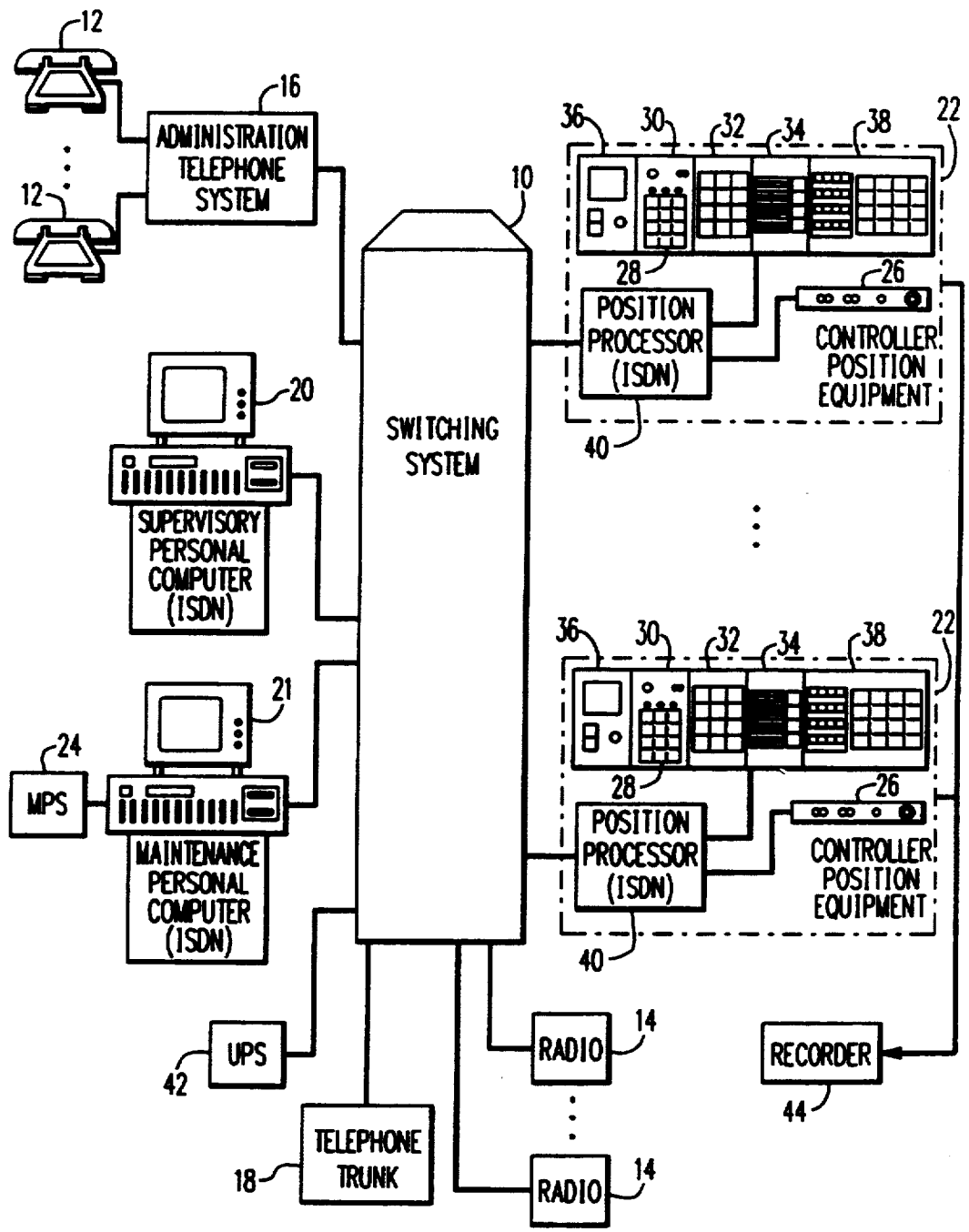
FIG. 1 is a block diagram of a local telecommunication network connected to a telecommunication switching system according to the present invention.

As illustrated in FIG. 1, a telecommunication switching system 10 according to the present invention can be used to connect many different types of telecommunication terminal equipment. The embodiment illustrated in FIG. 1 provides interconnections for air traffic controllers, but the present invention is not limited to the air traffic control environment. This environment has been selected as an example having many different types of equipment which takes full advantage of the present invention.

Analog devices such as telephones 12 and radios 14 are connected to analog interfaces in the switching system 10. The telephones 12 may be connected directly to the switching system 10 or an administrative telephone system 16 may connect a number of telephones 12 to a single analog interface of the switching system 10. In addition, telephone trunks may be connected via telephone trunk connections 18 to analog interfaces of the switching system 10 to connect to other switching systems, either conventional systems or systems constructed according to the invention, or to a private or public telephone network. Only one telephone trunk connection 18 is illustrated in FIG. 10, but ordinarily there will be more than one telephone trunk connected to the switching system 10. In an air traffic control application, most of the telephone trunks are leased lines connecting one air traffic control facility to another air traffic control facility.

The ISDN telecommunication equipment connected to the switching system 10 may be any type of ISDN terminal equipment. In the embodiment illustrated in FIG. 1, personal computers 20, 21 and position equipment 22 are connected to ISDN interfaces. The personal computers may perform a variety of functions, such as the supervisory personal computer 20 which monitors operation of the switching system 10 and the maintenance personal computer 21 which is used to perform maintenance on the switching system 10. Obviously, a single personal computer could be used for both purposes, but one of each is provided due to division of human labor. The maintenance personal computer 21 may be connected to a maintenance processor system (MPS) 24. The traffic controller position equipment 22 enables a traffic controller to connect a headset coupled to one of a plurality of jacks 26 to any of the terminal equipment connected to the system 10. Outside lines on the telephone trunk 18 can be dialed using a conventional dual tone multi-frequency (DTMF) 12-key pad 28 provided by an indirect address module 30 or by pressing one of the programmable buttons in a direct address module 32. Other phone features, such as hold, conference, etc. are initiated by an operator using an operation function module 34 and a speaker module 36 permits someone without a headset to hear what is being supplied to the headsets. A radio frequency (RF) module 38 selects the radios 14 for use by the air traffic controller using the position equipment 10.

A position processor 40, such as an INTEL 8188, controls the operation of the position equipment 22 and connects the position equipment 22 to the switching system 10. The switching system 10 must be capable of performing all of the external functions requested by a controller using the position equipment 22, while the position processor performs all internal functions. For example, the position processor 40 will control the dialing of numbers stored for use by the direct address module 32 and the displays, such as the radio frequency on the RF module 38. The switching system 10 is required to provide connection to the appropriate radio for communication with aircraft and to other position equipment 22 for communication with other air traffic controllers, such as when an aircraft passes from one controller's space to a space for which another controller is responsible. If the controller for the next space is in a different facility, connection is made to one of the telephone trunks 18. Each radio may be set at a different frequency for different airspaces in a conventional manner. However, the radios are not directly tied to a specific position, but rather are freely connectable to any of the position equipment 22 via the switching system 10. Also, different radios may be provided for different types of flights, such as commercial and military.

Other equipment may also be connected to the equipment illustrated in FIG. 1, such as an uninterruptable power supply (UPS) 42 and a recorder 44. The recorder 44 is a conventional recorder for recording all conversations between air traffic controllers and aircraft. In addition, relief briefings when air traffic controllers change shifts are recorded in response to activation of one of the buttons in the operation function module 34 under the control of the position processor 40.

Figure 2:
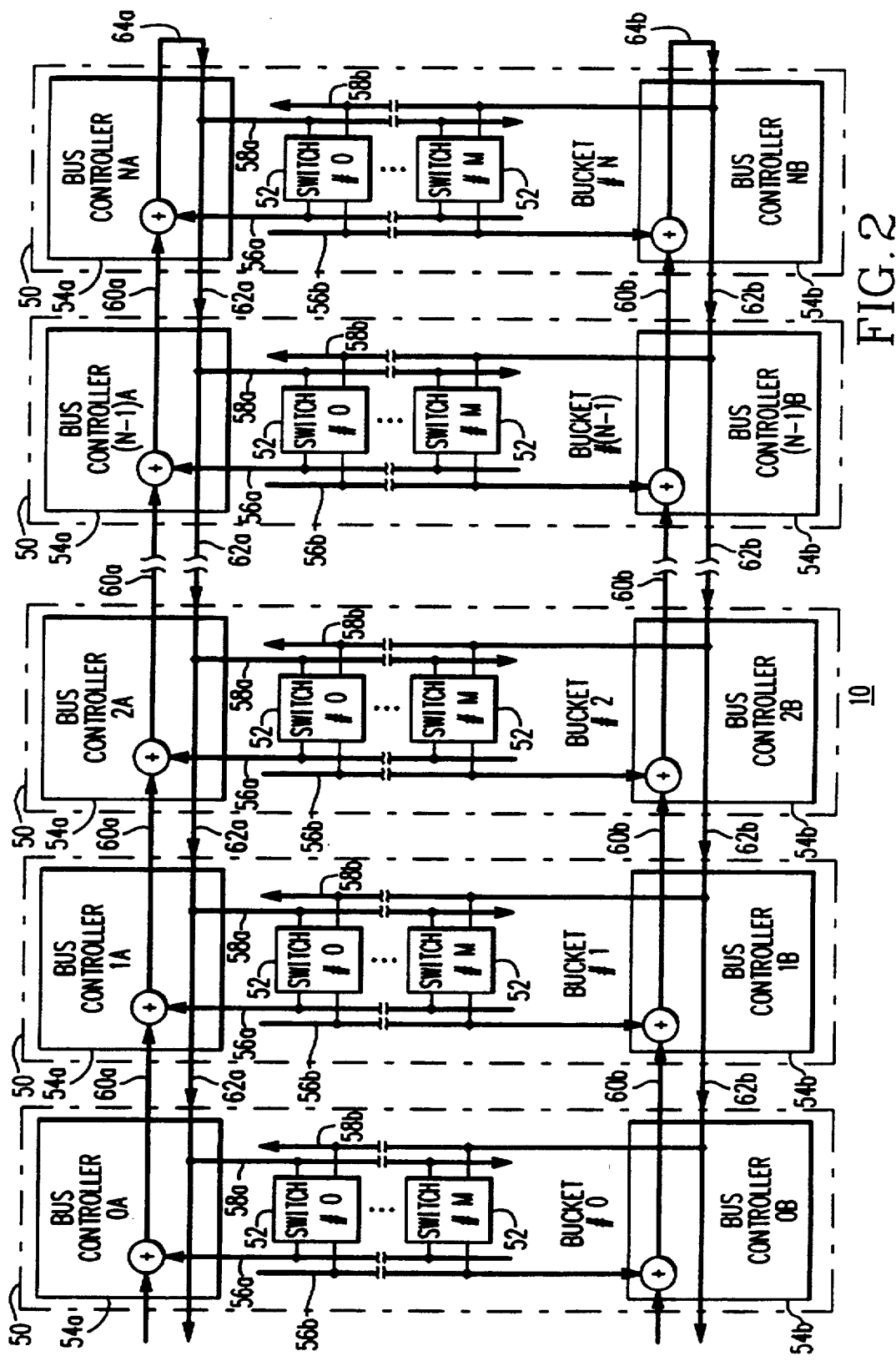
FIG. 2 is a block diagram of a telecommunication switching system according to the present invention.

FIG. 2 is a block diagram of a telecommunication switching system 10. The switching system 10 is a distributed processing system with N buckets 50 in physically separated cabinets. Each bucket 50 has a maximum of M processing modules 52. The processing modules are switch units which control the connections made by the system 10. A telecommunication switch system according to the present invention may be formed by a single bucket or cabinet 50 if the number of devices to be connected can be supported by the number of switch units 52 in a single bucket. On the other hand there may be five or more buckets 50 with 20 or more switch units 52 in each bucket 50.

Each bucket in the embodiment illustrated in FIG. 2 includes two bus controllers 54 and two sets of buses 56, 58, each set connected to a different bus controller 54 in a bucket 50. For example, in bucket #1 (second from the left) the bus controller 54a for the A bus is connected to a module collection bus 56a and a distribution bus 58a, while the bus controller 54b for the B bus is connected to a module collection bus 56b and a module distribution bus 58b.

The bus controllers 54a for the A bus are connected together by bucket collection buses 60a and bucket distribution buses 62a while the bus controllers 54b for the B bus are connected together by pairs of bucket collection and distribution buses 60b and 62b. Return buses 64a, 64b connect to the bus controllers 54a, 54b of bucket #N to route data from the bucket collection buses 60a, 60b to the bucket distribution buses 62a, 62b. Each bus is separated into a voice bus and a message bus as discussed in more detail below. As indicated by the arrowheads in FIG. 2, the buses are unidirectional and both voice data and messages circulate through the switching system 10 in the direction of the arrows. Data is output from the switch units 52 onto a module collection bus 56, routed through the corresponding bus controller 54 onto the bucket collection bus 60 and then returned via return bus 64 to be distributed to each of the switch units 52 via the bucket distribution bus 62 and module distribution buses 58. Additional details of the construction and operation of the busses and bus controllers are provided in copending applications filed on the same day as this application and incorporated herein by reference, entitled REDUNDANT SYNCHRONOUS MESSAGE BUS ARCHITECTURE, by Mark Hayman and Paul Lee, Ser. No. 07/743,488; TIME DIVISION MULTIPLEX VOICE DATA BUS by Paul Lee, Ser. No. 07/743,477, now U.S. Pat. No. 5,235,594; and REDUNDANT BUS SWITCHOVER by Paul Lee and Andrew Turgeon, Ser. No. 07/743,467, all of which are commonly owned with the present invention.

Figure 3:
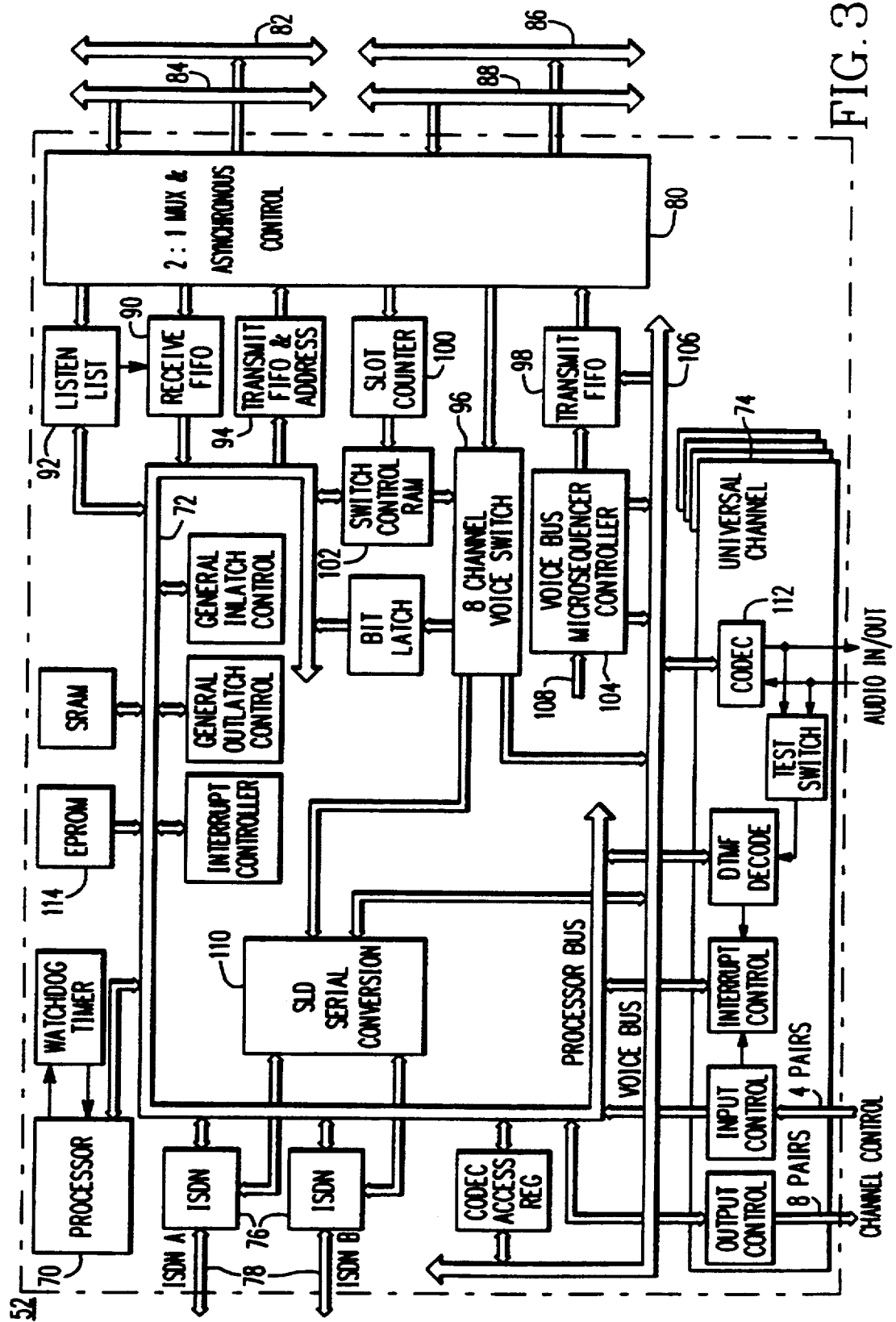
FIG. 3 is a block diagram of a switch unit according to the present invention.

The preferred embodiment of the switch unit 52 is illustrated in FIG. 3. Each switch unit includes a processor 70 which may be an INTEL 80C186. The processor 70 is connected via a processor bus 72 to most of the other components in the switch unit 52. Three types of interfaces are provided in the switch unit 52. Universal channels 74 provide analog interfaces. As illustrated in FIG. 3, four universal channels are included to provide interfaces to four analog devices. The ISDN devices are connected to ISDN interfaces 76 via ISDN data links 78. In the embodiment illustrated in FIG. 3, two ISDN interfaces are illustrated, each of which may be an AM2085 from Advanced Micro Devices of Sunnyvale, Calif. This enables two ISDN devices to be connected to the switch unit 52, or, as in the case of the preferred embodiment illustrated in FIG. 1, redundant connections to a single ISDN device, such as the position equipment 22. The third interface 80 connects the switch unit 52 to the module collection and distribution buses 56, 58.

The module collection and distribution buses 56, 58 include a message collection bus 82, a message distribution bus 84, a voice collection bus 86 and a voice distribution bus 88. The interface 80 provides 2:1 multiplexing and asynchronous control for communication between the switch unit 52 and the module collection and distribution buses 56, 58. As should be apparent, buses 82 and 86 together form the module collection bus 56 and buses 84 and 88 together form the module distribution bus 58.

Data to and from the switch unit 52 pass through the interface 80. Message data from the message distribution bus 84 are input to a receive FIFO 90 and are output therefrom to the processor bus 72 if the address associated with the command is included in a listen list 92. Messages are output to the message collection bus 82 via the interface 80 from a transmit FIFO and address register 94. Voice data from the voice distribution bus 88 is supplied to an 8-channel voice switch 96 which routes the voice data to one of the interfaces 74, 76 in a manner described below. Voice data from one of the terminal devices connected to the switch unit 52 are output from a transmit FIFO 98 through the interface 80 to the voice collection bus 86.

The voice collection and distribution buses 86 and 88 include only data and timing information. The timing information is detected by a slot counter 100. A switch control RAM 102 routes voice data from the voice distribution bus 88 when the slot counter 100 indicates that the voice data is from an interface which has been previously connected to one of the interfaces in the switch unit 52. Details of how the switch control RAM 102 determines whether a connection has been established are provided below. A voice bus microsequencer controller 104 controls operation of a voice bus 106 which is connected to the interface units 74, 76 and also controls output of the voice data by the transmit FIFO 98. As voice data is received from the interface units 74, 76, the voice data is stored in the transmit FIFO 98. Using a standard 8 KHz voice data sampling rate, 768 terminal devices can be connected by a voice bus operating at 6.144 MHz. If this clock rate is used for the buses in the present invention, 128 switch units, each providing support for six devices, like the switch unit 52 illustrated in FIG. 3, may be connected together. Thus, six buckets of twenty switch units each could be operated at this clock rate.

The voice bus microsequencer controller 104 receives a slot address on line 108 from jumpers on the backplane for its bucket 50 and instructs the transmit FIFO 98 to output six bytes of data, one from each of the interfaces 74, 76 to the voice collection bus 86 when the time slots for the interface units in the switch unit 52 occur. For each of the interface units which do not send any data to the transmit FIFO 98 during the time slots assigned to the switch unit 52, null data may be output or an invalid data flag set on the voice data collection bus 86.

Determinations of what data is received by the switch unit 52 are made differently for commands than for voice data. Details are provided in the copending applications which were incorporated by reference herein, but a brief summary follows. The listen list 92 includes addresses for messages to the switch unit 52. At a minimum, a unique address is assigned to each switch unit 52 and at least one broadcast address is stored in all of the switch units for messages which are to be received by all switch units 52. In addition, switch units may be grouped and have one or more multicast addresses. Also, each interface 74, 76 in a switch unit 52 preferably has its own unique address.

When an operator at position equipment 22 wants to establish communications with, e.g., one of the radios 14, a control signal, indicating which button in the RF module 38 was depressed, is transmitted from the operator equipment 22 via one of the ISDN data links 78 to the corresponding ISDN interface 76. The processor 70 receives the control signal and accesses two databases to determine what interface is used by the requested radio. The first database contains the radios accessible by the operator via the buttons in the RF module 38. The requested radio is determined based on the control signal. The second database is then accessed to determine the interface 74 and switch unit 52 connected to the requested radio.

Using the information in the second database, the processor 70 generates a message requesting connection to the requested radio, together with the address of the requested radio. The connection request message and address is stored in the transmit FIFO and address unit 94, respectively, and output to the message collection bus 82 when the time slots for the interfaces 74, 76 in the switch unit 52 occur on the voice collection bus 86. The message must wait its turn after any messages already in the FIFO 94 and may take up to six bytes (the total number of voice bytes from the interfaces in the switch unit 52). For messages longer than six bytes, subsequent frames are used.

The connection request message and address pass over the module collection bus 56 for the module containing the switch unit 52 and the bucket collection bus 60 until the message reaches the bus controller 54 for bucket #N. The message then passes through the return bus 64 and down the bucket distribution bus 62. The message is distributed to all of the switch units by the module distribution buses 58 in each bucket 50. All of the switch units 52 except the switch unit 52 connected to the requested radio will ignore the message, since the unique address associated with the message is not in the listen list 92 of the other switch units 52.

When the switch unit 52 connected to the requested radio receives the connection request message, the address associated with the message will match one of the addresses in the listen list 92 of the switch unit 52. Therefore, the message will be output from the receive FIFO 90 and the processor 70 will determine that a connection should be made to the operator equipment 22 which issued the request. The time slot for the ISDN interface 76 connected to the operator equipment 22 requesting connection to the requested radio will have a corresponding bit set in the switch control RAM 102 in the switch unit 52 connected to the requested radio.

In the case of the air traffic control system of the illustrated embodiment, communication via radio is one-way. Therefore, the above procedure is followed to enable an operator to transmit via radio. If an operator wishes to listen to a radio, the two databases are accessed as described above to determine the time slot of the requested radio. Then, the switch unit 52 connected to the operator equipment 22 requesting connection to the radio sets a bit corresponding to the time slot of the requested radio in its switch control RAM 102. In the case of two-way communication, a bit is set in the switch control RAM 102 for both the requesting and requested devices.

Whenever an operator who requested transmission via a radio speaks into the microphone of his or her headset, a serial conversion unit 110 outputs parallel voice data on the voice bus 106 and the voice data is stored in the transmit FIFO 98. When the time slot for the ISDN interface 76 connected to the operator equipment 22 occurs on the voice data collection bus 86, the voice data stored in the transmit FIFO 98 is output via the interface 80. This voice data travels around the collection buses 56, 60, the return bus 64 and the distribution buses 62, 58. When the voice data reaches the switch unit 52 connected to the requested radio, the slot counter 100 will indicate the slot for the ISDN interface 76 connected to the operator equipment 22. As a result of the operations described above establishing connection between the radio 14 and operator equipment 22, the switch control RAM 102 will operate the voice switch 96 to output the voice data from the operator equipment 22 to the radio 14 connected to one of the interfaces 74. The analog interface 74 may contain conventional components including a CODEC 112 for converting the digital voice data into an analog audio signal which can be supplied to the radio 14.

When a radio 14 receives signals from one of the aircraft, a similar operation occurs in reverse. The CODEC 112 converts the analog signals into digital signals which are sent to the transmit FIFO 98 via the voice bus 106. The voice data is output on the voice collection bus 86 in the time slot for the radio 14 and sent through the buses 56, 60, 64, 62, 58 in the switching system 10 to the switch unit 52 for the operator equipment 22 of an operator who requested to listen to the radio 14. The switch control RAM 102 in the switch unit 52 connected to the operator equipment 22 controls the voice switch 96 to output the voice data to the serial conversion unit 110 when the time slot of the requested radio appears on the voice data distribution bus 88. The serial conversion unit 110 converts the parallel voice data into serial data for output to the ISDN interface 76 connected to the operator equipment 22 and the operator hears the radio signals in the earphones of his or her headset.

Note that the routing of signals through the return bus 64 occurs for all data. Even if the radio 14 requested by an operator is connected to an analog interface 74 in the same switch unit 52 connected to the operator equipment 22 of the requesting operator, the voice data preferably is not routed directly between the ISDN interface 76 connected to the operator equipment 22 and the analog interface 74 connected to the radio 14 via the voice bus 106. By routing all data through the return bus 64, regardless of the proximity of the destination terminal to the originating terminal, the program controlling the processor 70 is simplified and the bus controllers 54 do not require any intelligence.

The operations performed by the processor 70 are programmed in an EPROM 114. The EPROM 114 is preferably the same in all of the switch units 52 in the switching system 10. This simplifies maintenance operations and updating of the capabilities provided by the system 10.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described. For example, in a more homogenous environment having no ISDN equipment, minor changes may be made to the program stored in the EPROM 114 if necessary and the chips providing ISDN interfaces 76 may be removed, reducing the cost of the switch units 52. Similar reductions in the analog interfaces 74 could be made in a switching system 10 used in an all ISDN environment. Accordingly, suitable modifications and equivalents may be resorted to, as falling within the scope and spirit of the invention.

What is claimed is:

1. A system for interconnecting telecommunication terminal equipment, comprising:

first and second bus controllers, first and second module collection buses, first and second module distribution buses, and a plurality of switch units for controlling the connection of said telecommunication terminal equipment, each of said switch units being connected to said first and second module collection buses and being connected to said first and second module distribution buses, and each of said switch units including an interface for connection to the telecommunication terminal equipment supported by said system and a processor to control access to said system by the telecommunication terminal equipment connected thereto;

said first bus controller being connected to said first module collection bus and said first module distribution bus;

said second bus controller being connected to said second module collection bus and said second module distribution bus;

a first clock means in said first bus controller for providing timing on said first module collection bus and said first module distribution bus;

a second clock means in said second bus controller for providing timing on said second module collection bus and said second module distribution bus, and wherein said first and second module collection buses and said first and second module distribution buses are unidirectional circulating time division multiplex buses and each interface in each switch unit transmits telecommunication data and control signals in an assigned time slot via said first and second module collection buses and said first and second module distribution buses to all other ones of said interfaces in all of said switch units.

2. A system as recited in claim 1, wherein each of said switch units further includes a program memory for storing a control program, the control program being identical in each of said switch units.

3. A system as recited in claim 2, further comprising at least one telephone trunk connection, connected to the interfaces of one of said switch units, said system enabling any of the telecommunication terminal equipment to connect to said at least one telephone trunk connection to provide connection to other telecommunication systems.

4. A system as recited in claim 2, wherein each of said switch units includes at least one integrated systems digital network interface and at least one analog interface, for integrated systems digital network terminal equipment and analog terminal equipment, respectively.

5. A system as recited in claim 1, further comprising:
a second cabinet including third and fourth bus controllers, third and fourth module collection buses, third and fourth module distribution buses, and a plurality of additional switch units for controlling the connection of the telecommunication terminal equipment, each of said additional switch units being connected to said third and fourth module collection buses and being connected to said third and fourth module distribution buses, and each of said additional switch units including an interface for connection to the telecommunication terminal equipment supported by said system and a processor to control access to said system by the telecommunication terminal equipment connected thereto;
said third bus controller being connected to said third module collection bus and said third module distribution bus;
said fourth bus controller being connected to said fourth module collection bus and said fourth module distribution bus;
a third clock means in said third bus controller for providing timing on said third module collection bus and said third module distribution bus;
a fourth clock means in said fourth bus controller for providing timing on said fourth module collection bus and said fourth module distribution bus;
first and second unidirectional bucket collection buses;
first and second unidirectional bucket distribution buses;
a first return bus for connecting said first bucket collection bus to said first bucket distribution bus;
a second return bus for connecting said second bucket collection bus to said second bucket distribution bus; and
wherein said first and third bus controllers are connected to said first bucket collection bus and said first bucket distribution bus and said second and fourth bus controllers are connected to said second bucket collection bus and said second bucket distribution bus.

6. A telecommunication station, comprising:
a plurality of switch units for controlling the connection of telecommunication equipment, each of said switch units including
a processor;
analog terminal interfaces;
integrated systems digital network terminal interfaces;
a switch unit bus to connect said processor, said analog terminal interfaces and said integrated systems digital network interfaces; and
a system bus interface operatively connected to said switch unit bus;
a system bus operatively connected to said system bus interface of each of said switch units;
operator position equipment, each including
an audio input/output device for transmitting audio signals to and from an operator;
a position interface unit, operatively connected to said audio input/output device and said integrated systems digital network terminal interface in a corresponding switch unit; and
an operator control unit, operatively connected to said position equipment interface, for receiving indications from the operator instructing connection of said operator position equipment by said switch units;
radios, each operatively connected to one of said analog terminal interfaces in one of said switch units and connectable via said switch units to any of said operator position equipment; and
at least one telephone trunk connection operatively connected to one of said analog terminal interfaces in one of said switch units and connectable to any of said operator position equipment via said switch units;
clock means for providing timing on said system bus, and
wherein said system bus is a unidirectional circulating time division multiplex bus and each system bus interface in each switch unit transmits telecommunication data and control signals in an assigned time slot via said system bus to all other ones of said system bus interfaces in all of said switch units.

* * * * *